US010943416B2

(12) United States Patent
Salah et al.

(10) Patent No.: US 10,943,416 B2
(45) Date of Patent: Mar. 9, 2021

(54) SECURED COMMUNICATION IN PASSIVE ENTRY PASSIVE START (PEPS) SYSTEMS

(71) Applicant: STRATTEC SECURITY CORPORATION, Milwaukee, WI (US)

(72) Inventors: Abdel H. Salah, Greenfield, WI (US); Prahlad Narasimhamurthy RamaKrishna, Bangalore (IN); Bindu Madhavan Krishnamurthy, Bangalore (IN); Amarnath Kanchi, Ballari (IN)

(73) Assignee: STRATTEC SECURITY CORPORATION, Milwaukee, WI (US)

( * ) Notice: Subject to any disclaimer, the term of this patent is extended or adjusted under 35 U.S.C. 154(b) by 0 days.

(21) Appl. No.: 16/406,933

(22) Filed: May 8, 2019

(65) Prior Publication Data
US 2019/0347882 A1 Nov. 14, 2019

Related U.S. Application Data

(60) Provisional application No. 62/669,256, filed on May 9, 2018.

(51) Int. Cl.
*H04L 9/00* (2006.01)
*G07C 9/00* (2020.01)
(Continued)

(52) U.S. Cl.
CPC .......... *G07C 9/00309* (2013.01); *B60R 25/24* (2013.01); *H04L 1/003* (2013.01);
(Continued)

(58) Field of Classification Search
CPC ........ G06F 21/32; G06F 21/35; G06F 21/602; G06F 21/6254; G06F 3/0623;
(Continued)

(56) References Cited

U.S. PATENT DOCUMENTS 6,424,056 B1 7/2002 Irvin
7,629,875 B2 12/2009 Baumgartner et al.
(Continued)

FOREIGN PATENT DOCUMENTS

WO 2017062448 A1 4/2017
WO 2017181035 A1 10/2017
WO 2018127353 A1 7/2018

OTHER PUBLICATIONS

International Search Report and Written Opinion for Application No. PCT/US2019/031414 dated Jul. 23, 2019 (16 pages).
(Continued)

*Primary Examiner* — Dionne Pendleton
(74) *Attorney, Agent, or Firm* — Michael Best & Friedrich LLP

(57) ABSTRACT

Systems and methods for secure communication between a vehicle and a portable communication device. One system includes a vehicle access system included in the vehicle. The vehicle access system is configured to wirelessly receive a shuffled message from the portable communication device, de-shuffle the shuffled message at a bit level to obtain a message, wherein de-shuffling the shuffled message at a bit level includes exchanging one bit at a first indexed position within the shuffled message with one bit at a second indexed position within the shuffled message, and initiate a vehicle operation based on the message.

20 Claims, 12 Drawing Sheets

(51) Int. Cl.
*B60R 25/24* (2013.01)
*H04L 9/06* (2006.01)
*H04L 1/00* (2006.01)
*H04L 9/34* (2006.01)

(52) U.S. Cl.
CPC .............. *H04L 1/0042* (2013.01); *H04L 9/00* (2013.01); *H04L 9/006* (2013.01); *H04L 9/06* (2013.01); *H04L 9/065* (2013.01); *H04L 9/34* (2013.01); *G07C 2009/00412* (2013.01); *G07C 2009/00547* (2013.01)

(58) Field of Classification Search
CPC ................... G06F 3/0632; G06F 3/067; G07C 2009/00984; G07C 5/008; G07C 9/00309; G07C 9/00571; G07C 9/00896; G07C 9/257; G07C 9/26; G07C 2009/00412; G07C 2009/00547; G08G 1/20; H04W 12/0013; H04W 16/14; H04W 28/22; H04W 4/80; H04W 56/0085; H04W 64/00; H04W 72/10; H04W 74/04; H04W 84/00; H04W 8/245; H04W 12/0401; H04W 12/04033; H04W 12/06; H04W 12/1006; Y02T 10/7005; Y02T 10/7072; Y02T 90/121; Y02T 90/128; Y02T 90/14; Y02T 90/16; Y02T 90/163; Y02T 90/169; Y04S 30/14; H04L 2209/08; H04L 9/065; H04L 1/0061; H04L 1/0075; H04L 2209/043; H04L 2209/16; H04L 2209/80; H04L 2209/805; H04L 63/0838; H04L 63/0853; H04L 63/0861; H04L 63/162; H04L 9/06; H04L 9/0662; H04L 9/12; H04L 9/14; H04L 9/16; H04L 9/34; H04L 1/0042; H04L 1/003; H04L 9/00; H04L 9/006; H04L 9/0869; H04L 2209/34; H04L 9/0618; H04L 9/0631; H04L 9/0637; H04L 9/0643; H04L 9/0656; H04L 9/0825; H04L 9/0841; H04L 9/0847; H04L 9/088; H04L 9/0891; B28C 5/422; B28C 7/02; B28C 7/028; B28C 9/00; B60L 53/65; B60P 3/03; B60R 25/2081; B60R 25/24; B60R 25/25; G01M 17/00; H03M 13/09

See application file for complete search history.

(56) References Cited

U.S. PATENT DOCUMENTS

| | | | |
|---|---|---|---|
| 8,126,450 B2 | 2/2012 | Howarter et al. | |
| 8,344,850 B2 | 1/2013 | Girard, III et al. | |
| 8,373,541 B2 | 2/2013 | Tarmoom et al. | |
| 8,421,589 B2 | 4/2013 | Sultan et al. | |
| 8,751,065 B1 | 6/2014 | Kato | |
| 8,847,731 B2 | 9/2014 | Tieman | |
| 9,008,917 B2 | 4/2015 | Gautama et al. | |
| 9,045,102 B2 | 6/2015 | Caratto et al. | |
| 9,079,560 B2 | 7/2015 | Gautama et al. | |
| 9,162,648 B1 | 10/2015 | Weng et al. | |
| 9,173,100 B2 | 10/2015 | Ricci | |
| 9,210,188 B2 | 12/2015 | Choi et al. | |
| 9,218,700 B2 | 12/2015 | Gautama et al. | |
| 9,241,235 B2 | 1/2016 | Santavicca | |
| 9,336,637 B2 | 5/2016 | Neil et al. | |
| 9,533,653 B2 | 1/2017 | Daman et al. | |
| 9,536,364 B2 | 1/2017 | Talty et al. | |
| 9,536,365 B2 | 1/2017 | Wisnia | |
| 9,666,005 B2 | 5/2017 | Ellis et al. | |
| 9,694,787 B2 | 7/2017 | Kornek et al. | |
| 9,736,669 B2 | 8/2017 | Frye et al. | |
| 9,802,574 B2 | 10/2017 | Jakobsson | |
| 9,807,570 B1 | 10/2017 | Lazarini et al. | |
| 9,845,070 B2 | 12/2017 | Petel et al. | |
| 9,875,591 B2 | 1/2018 | Walters et al. | |
| 10,115,252 B2 | 10/2018 | Pluss et al. | |
| 10,124,768 B1 | 11/2018 | Bocca et al. | |
| 10,131,321 B1 | 11/2018 | Ahsan et al. | |
| 10,137,860 B2 | 11/2018 | Zielinski et al. | |
| 10,217,300 B2 | 2/2019 | Ziller | |
| 10,231,123 B2 | 3/2019 | Schussmann et al. | |
| 10,239,494 B2 | 3/2019 | Spiess | |
| 2001/0010088 A1* | 7/2001 | Anzai | H04L 1/0045 714/782 |
| 2006/0120521 A1* | 6/2006 | Whitehead | H04L 1/0045 380/46 |
| 2006/0142913 A1* | 6/2006 | Coffee | G07C 5/008 701/29.3 |
| 2008/0044012 A1* | 2/2008 | Ekberg | H04W 12/0013 380/30 |
| 2009/0169001 A1* | 7/2009 | Tighe | H04L 9/34 380/217 |
| 2016/0203661 A1 | 7/2016 | Pudar et al. | |
| 2016/0241999 A1 | 8/2016 | Chin et al. | |
| 2016/0267730 A1* | 9/2016 | Wadhwani | H04L 63/0853 |
| 2016/0318475 A1 | 11/2016 | Honkanen | |
| 2016/0325710 A1 | 11/2016 | Honkanen | |
| 2017/0018128 A1 | 1/2017 | Berezin et al. | |
| 2017/0050615 A1 | 2/2017 | Schindler | |
| 2017/0236351 A1 | 8/2017 | Menard et al. | |
| 2017/0243422 A1 | 8/2017 | Menard et al. | |
| 2017/0298659 A1 | 10/2017 | Watanabe | |
| 2017/0353302 A1* | 12/2017 | Fernandez | H04L 9/0662 |
| 2018/0007078 A1 | 1/2018 | Motos et al. | |
| 2018/0029560 A1 | 2/2018 | Mohaupt et al. | |
| 2018/0099643 A1 | 4/2018 | Golsch et al. | |
| 2019/0003439 A1 | 1/2019 | Chaplow et al. | |
| 2019/0036625 A1 | 1/2019 | Tsujita | |
| 2019/0047512 A1 | 2/2019 | Gersabeck et al. | |
| 2019/0061686 A1 | 2/2019 | Neuhoff et al. | |

OTHER PUBLICATIONS

International Preliminary Report on Patentability for related Application No. PCT/US2019/031414 dated Jun. 15, 2020 (25 Pages).

* cited by examiner

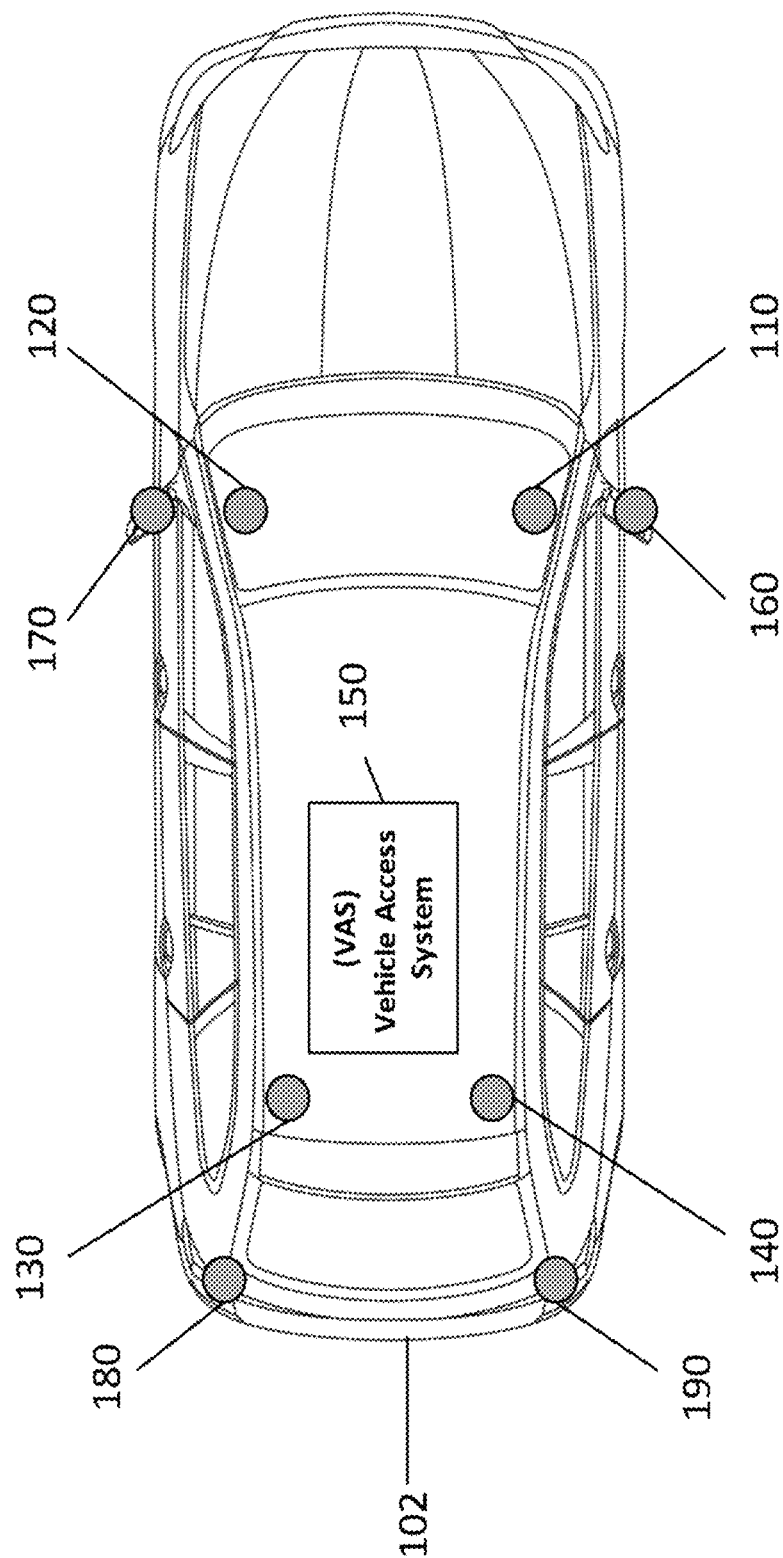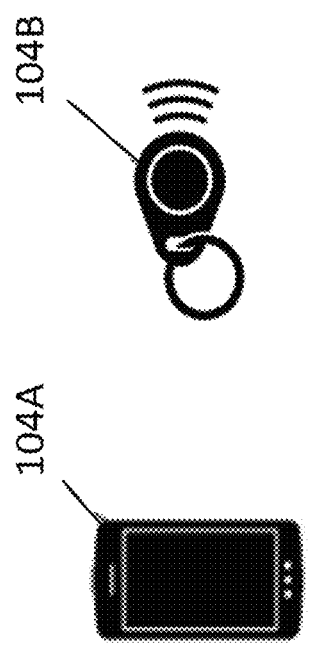
FIG. 1

SECURED COMMUNICATION IN PASSIVE ENTRY PASSIVE START (PEPS) SYSTEMS

RELATED APPLICATIONS

This application claims priority to U.S. Provisional Patent Application No. 62/669,256 filed on May 9, 2018, the entire content of which is incorporated herein by reference.

FIELD

Embodiments provided herein relate to security mechanisms for pairing Bluetooth modules, thereby enabling secure exchange of user-specific data between Bluetooth modules, and, in particular, addressing various Bluetooth Low Energy (BLE)-based security attacks.

SUMMARY

Over the years, vehicle-based access systems have seen many changes in technology. Early vehicles relied primarily on mechanical locks and keys to secure access to the interior of the vehicle. Later, keyless entry systems were introduced, which, in some embodiments, included a keypad installed on the vehicle door, and that provided access to the vehicle upon user entry of a passkey. More recently, remote keyless entry systems using handheld transmitters were introduced. These handheld transmitters enable users to remotely lock and unlock a vehicle, and typically operate over radio waves at around 300-450 MHz.

Remote Keyless Entry (RKE) systems were further improved with the introduction of Passive Entry Passive Start (PEPS) systems. In these systems, the user does not need to manually operate a portable communication device to lock and unlock the vehicle but only needs to carry the device (for example, a key fob) with him or her. In particular, the user is only required to come within the vicinity of the vehicle, which is usually within 1-2 meters, after which data exchange between the key fob and the vehicle takes place before the vehicle is unlocked. PEPS systems typically work on radio frequencies of 300-450 MHz. PEPS systems, however, may also be operated at a radio frequency of 2.4 GHz using Bluetooth or BLE technology, where a member or slave device carried by the user and a master or host device in the vehicle communicate over a 2.4 GHz-based BLE protocol. As used herein, "Bluetooth" refers to near field wireless technology for exchanging data between devices over short distances using short-wavelength ultra-high frequency (UFH) radio waves in the industrial, scientific and medical radio bands, from 2.400 to 2.485 GHz.

For example, in some PEPS systems, when the user carrying the member device (key fob) is detected in a defined vicinity zone of a vehicle, a receiver mounted in the vehicle (in the host device) connects with the member device over a BLE protocol. The connection process may include authentication by secret key exchange between the host device and the member device. This process of secret key exchange and validation is sometimes referred to as "pairing." In response to a successful pairing, exchange of encrypted and secured data between the host device and the member device takes place, which allows for control over various vehicle operations, such as unlocking a door of the vehicle to provide the user with access to the vehicle. PEPS systems with BLE communication operating at 2.4 GHz in place of legacy systems operating at 300-450 MHz allow smart phones or other portable communication devices to be used as a key to a vehicle. For example, smart phones are commonly equipped with Bluetooth technology and is widely used as a wireless medium to connect to Bluetooth-enabled devices. Thus, these systems allow a user to use a smart phone to interact with and access a vehicle in place of carrying a separate, traditional dedicated device, such as a key fob. However, in some embodiments, a traditional key fob can also be upgraded with Bluetooth technology and, thus, can server as a primary device for communicating with PEPS systems or, in some embodiments, a back-up device in the event of damage or theft to a user's primary device (for example, the user's smart phone).

Securing the process of pairing a vehicle and a portable communication device and the exchange of data between the vehicle and the portable communication device thereafter represent challenging and important security functions associated with BLE PEPS systems. In particular, Bluetooth based systems can be subject to various security attacks. There attacks include man-in-the-middle attacks, passive eaves dropping attacks, brute forcing attacks, replay attacks, and relay attacks.

Accordingly, systems and methods described herein provide secure BLE-based PEPS systems that address security vulnerabilities with Bluetooth technology to provide users safe and secure access and control over their vehicles. In some embodiments, the conventional automotive frequency band is replaced by industrial, scientific, and medical (ISM) band frequencies. This not only enables vehicle access using key fobs, but also enables access using other handheld devices such as, for example, smart phones and wearables. In various embodiments, methods for securing PEPS functions in a vehicle using the ISM band of frequencies and using BLE as a wireless communication protocol are utilized to perform functions including pairing, bonding, user commands, such as lock and unlock commands, and the like. Furthermore, as using hand-held communication devices with BLE communication capabilities (for example, in key fobs and smartphones) can invite security threats, embodiments described here address such threats. In particular, embodiments described herein provide security systems and methods strategically designed to take into account various possible methods to breach BLE communication protocols at different levels of data flow to provide user information and data that is exchanged wirelessly. In some cases, the systems and method provide various modules implemented in the application layer, such as a data shuffling engine, a cyclic redundancy check (CRC) module, and Advanced Encryption Standard (AES) encryption, which may be provided apart from a stack-offered security mechanisms. Other BLE stack-offered security mechanisms, such as out-of-band (OOB) pairing (for example, using near field communication (NFC)) and encryption (for example, AES Counter with CBC-MAC (CCM)) in the link layer (LL) can also be provided.

For example, embodiments disclosed herein provide a hands-free method for secure access to a vehicle by an authorized user. In some embodiments, the systems and methods described herein include ultra high frequency (UHF)-supported modules. The modules communicate over an ultra high frequency (UHF)-based communication protocol for learning about each other and to serve PEPS system functions, such as localization and secure data exchange. A secure method of learning and authenticating and performing data exchange between a host device and a member device provides secure access to the vehicle and thwarts illegal authorization into a vehicle by intruders.

In particular, some embodiments provide a system for secure communication between a vehicle and a portable communication device. The system includes a vehicle access system included in the vehicle. The vehicle access system is configured to wirelessly receive a shuffled message from the portable communication device, de-shuffle the shuffled message at a bit level to obtain a message, wherein de-shuffling the shuffled message at a bit level includes exchanging one bit at a first indexed position within the shuffled message with one bit at a second indexed position within the shuffled message, and initiate a vehicle operation based on the message.

Other embodiments provide a method for secure communication between a vehicle and a portable communication device. The method includes wirelessly receiving, with a vehicle access system included in the vehicle, a shuffled message from the portable communication device, de-shuffling, with the vehicle access system, the shuffled message at a bit level to obtain a message, wherein de-shuffling the shuffled message at a bit level includes exchanging one bit at a first indexed position within the shuffled message with one bit at a second indexed position within the shuffled message, and initiating, with the vehicle access system, a vehicle operation based on the message.

Yet further embodiments provide a vehicle access system installed in a vehicle. The vehicle access system includes a wireless near-field communication transceiver and an electronic processor. The wireless near-field communication transceiver is configured to wirelessly receive a shuffled message from a portable communication device, de-shuffle the shuffled message at a bit level to obtain a message, wherein de-shuffling the shuffled message at a bit level includes exchanging one bit at a first indexed position within the shuffled message with one bit at a second indexed position within the shuffled message, and provide the message to the electronic processor. The electronic processor is configured to initiate a vehicle operation based on the message.

Other aspects of the various embodiments provided herein will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 illustrates a vehicle providing passive entry passive start (PEPS) functionality according to some embodiments.

DETAILED DESCRIPTION

Figure 2:
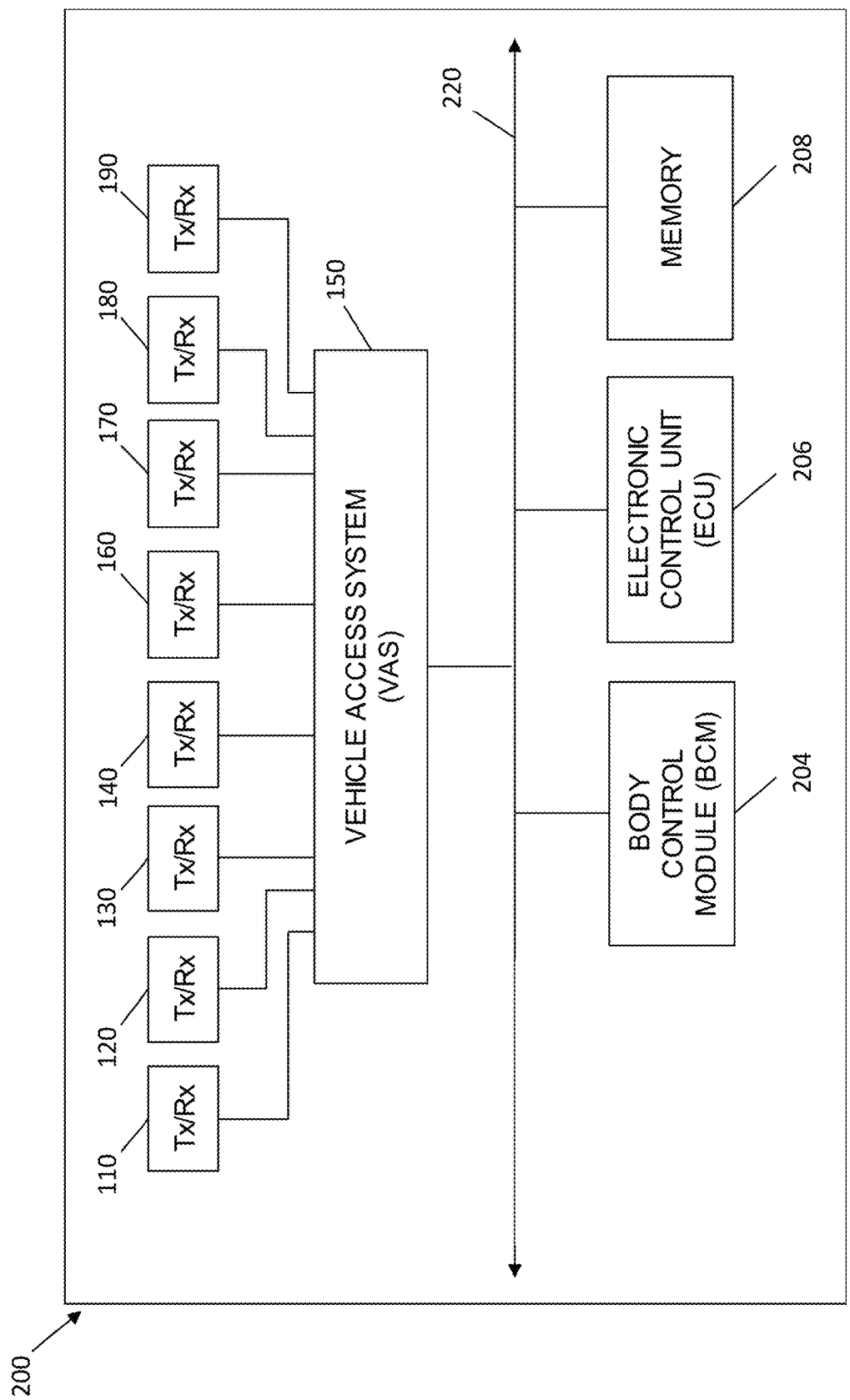
FIG. 2 is a block diagram of a PEPS system included in the vehicle of FIG. 1 according to some embodiments.

One or more embodiments are described and illustrated in the following description and accompanying drawings. These embodiments are not limited to the specific details provided herein, and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed.

Furthermore, some embodiments described herein may include one or more electronic processors configured to perform the described functionality by executing instructions stored in non-transitory, computer-readable medium. It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparati described herein. Alternatively, some or all functions could be implemented by a state machine that has no stored program instructions, or in one or more application-specific integrated circuits (ASICs), in which each function or some combinations of certain of the functions are implemented as custom logic. Of course, a combination of the two approaches could be used. In particular, the systems and methods and related functionality described herein, including the passive entry passive start (PEPS) function can be implemented via hardware, software, firmware, system on-a-chip technology, or a combination thereof.

Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings, and can include electrical connections or couplings, whether direct or indirect.

As noted above, in a Passive Entry Passive Start (PEPS) system, a user carries a portable communication device that serves as a transceiver for communicating with a vehicle. In response to the portable communication device coming within the vicinity of the vehicle, the portable communication device pairs and bonds to a receiver included in the vehicle, such as per a Bluetooth Low Energy (BLE) protocol. Upon pairing and bonding, commands can be transmit to and received by a controller of a vehicle access system (VAS) included in the vehicle. In many embodiments, pairing is the first part of the BLE communication process and data exchange is the second part of the BLE communication. In a BLE stack-provided process, the stake holders of the BLE communication learn about each other and share link layer (LL) encryption keys for LL encryption and decryption. Bonding is also a stack-offered process, where the stake holders in a BLE connection store information about each other. Encryption keys from a first pairing process are stored in respective non-volatile memories to avoid pairing processes upon re-connection. Bonding is a process in which the devices list each other as trusted devices, and bond every time after the first instance of pairing.

Although PEPS systems improve user experience, as noted above, PEPS systems (especially PEPS systems using a BLE protocol) can invite attention from hackers and thieves who seek loopholes and voids in security features provided by the core BLE stack. For example, Bluetooth, as a technology, is vulnerable to attacks such as man-in-the-middle (MITM) attacks, passive eavesdropping attacks, brute forcing attacks, replay attacks, relay attacks, and the like. In a MITM BLE attack, the attacker passively eavesdrops on the communication between the stake holders in the BLE connection, and sniffs data that is exchanged between them. Embodiments described herein secure the process of pairing and data communication, thereby improving the security of user data against various BLE-based attacks.

FIG. 1 illustrates a vehicle 102 providing passive entry passive start (PEPS) functionality in accordance with some embodiments. As shown in FIG. 1, the vehicle 102 includes a vehicle access system (VAS) 150 and one or more transceivers. In some embodiments, as illustrated in FIG. 1, the vehicle 102 includes transceivers 110, 120, 130 and 140 positioned within the vehicle 102 (for example, placed at four corners within an interior portion of the vehicle 102) and, optionally, one or more transceivers 160, 170, 180, and 190 positioned on an exterior surface of the vehicle 102 (for example, placed at four exterior positions on the vehicle 102). As used in the present application, an "exterior surface" includes a position outside of the vehicle body or passenger compartment, which may be outside or inside a component of the vehicle 102. For example, in some embodiments, one or more of the transceivers, such as transceivers 160, 170, 180, or 190, are positioned within a mirror of the vehicle 102, a bumper or fender of the vehicle 102, or the like, which positions these transceivers outside of the vehicle body or passenger compartment. The configuration of transceivers illustrated in FIG. 1 represents one example configuration. In other embodiments, fewer or additional transceivers can be used in various configurations, including the use of a single transceiver.

The VAS 150 and the transceivers communicate with a portable communication device 104, such as a smart phone 104A, a key fob 104B, or the like. For example, although not described herein, the transceivers communicate with the portable communication device to perform localization services for determining a location of the portable communication device 104 with respect to the vehicle 102. The VAS 150 communicates with the portable communication device 104 to perform the pairing, bonding, and data exchange as described herein.

The VAS 150 and the transceivers form a PEPS system. For example, FIG. 2 is a block diagram of a PEPS system 200 included in the vehicle 102 according to some embodiments. In addition to the VAS 150 and the transceivers, the PEPS system 200 includes a body control module (BCM) 204, an electronic control unit 206, and a memory 208. The BCM 204, electronic control unit 206, and the VAS 150 are coupled to a vehicle bus 220. As illustrated in FIG. 2, the transceivers are also communicatively coupled to the VAS 150 (for example, via a wired connection, a wireless connection, or a combination thereof).

In some embodiments, the BCM 204 is responsible for monitoring and controlling various electronic accessories associated with the vehicle 102. The BCM 204 may control load drivers and actuate relays that in turn perform actions in the vehicle 102, such as controlling a central locking system of the vehicle 102 (for example, locking or unlocking of one or more doors included in the vehicle 102 (or other lockable components of the vehicle 102)). In some embodiments, the BCM 204 is also configured to control power windows, power mirrors, air conditioning equipment, overhead lamps, an immobilizer associated with the vehicle 102, or the like. To perform this control, the BCM 204 communicates with other on-board computers and systems included in the vehicle 102 via the vehicle bus 220. The vehicle bus 220, or other component interconnections, permit communication among the components of the PEPS system 200. The vehicle bus 220 may be, for example, one or more buses or other wired or wireless connections as is known in the art. The vehicle bus 220 may have additional elements, which are omitted herein for simplicity, such as controllers, buffers (for example, caches), drivers, repeaters and receivers, or other similar components, to enable communications. The vehicle bus 220 operates according to one or more addressing schemes, data communication or connection protocols, or the like to enable appropriate communications among the aforementioned components.

The electronic control unit 206 is an embedded system that controls one or more systems or subsystems (for example, electrical systems or subsystems) included in the vehicle 102, such as, for example, the vehicle's engine and other components. In some embodiments, the vehicle 102 is a hybrid or electric vehicle. Thus, in these embodiments, the electronic control unit 206 may be configured to control a motor or other powertrain component of the vehicle 102.

Although the electronic control unit 206 is shown as being part of the PEPS system 200 in the embodiment illustrated in FIG. 2, in other embodiments, the electronic control unit 206 may be separate from the PEPS system 200, and the electronic control unit 206 may or may not communicate with the PEPS system 200 in this configuration. For example, in some embodiments, vehicle start or engine start is controlled by the BCM 204, so authorization from the PEPS system 200 is provided to the BCM 204. However, the vehicle 102 may include additional supporting components (for example, an electrical steering control unit) that provide signals to the BCM 204, which can be used for authentication or other purposes. Thus, in these configurations, the PEPS system 200 may communicate with the ECU 206 (or other ECUs) indirectly. As illustrated in FIG. 2, the ECU 206 communicates with the BCM 204 via the vehicle bus 220 (which other components of the PEPS system 200 may also use to communicate).

Figure 3:
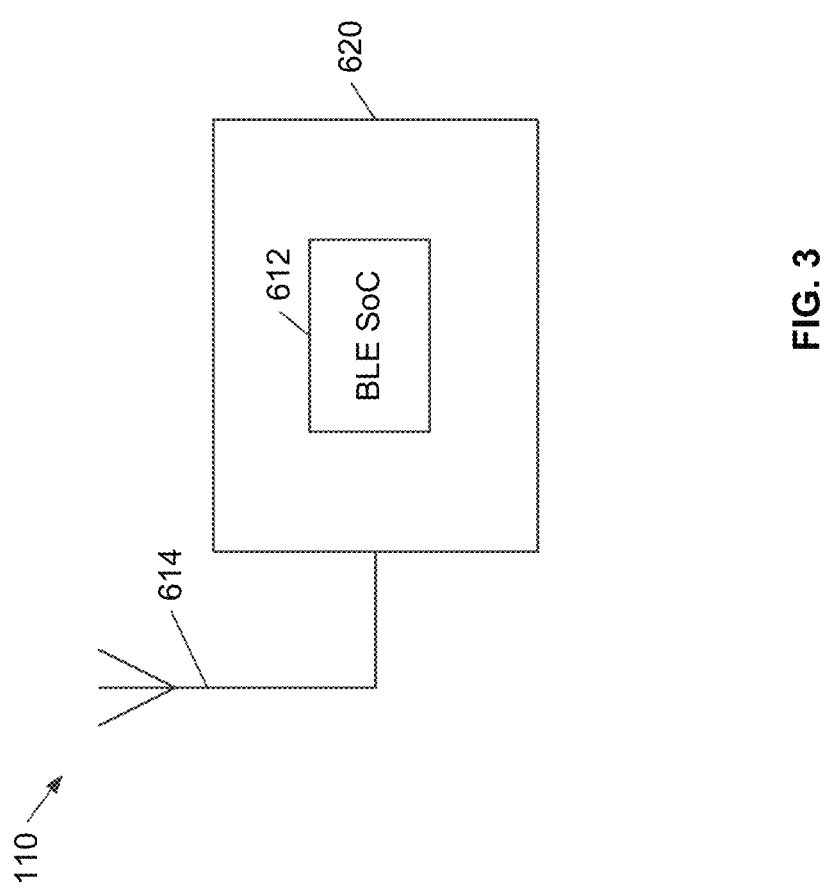
FIG. 3 illustrates a transceiver included in the PEPS system of FIG. 2 according to some embodiments.

FIG. 3 is a block diagram of one of the transceivers (transceiver 110 for illustrative purposes) included the vehicle 102 according to some embodiments. The illustrated transceiver 110 includes a BLE module used for providing various PEPS functionalities in accordance with some embodiments. For example, the transceiver 110 illustrated in FIG. 3 includes a BLE transceiver or module 620 having an integrated circuit, such as BLE system-on-chip (SoC) 612, and an antenna 614. The antenna 614 is configured to receive Bluetooth signals from the portable communication device 104 that is trying to access the PEPS functionalities of the vehicle 102. The antenna 614 may be an omnidirectional antennae. It should be understood that the transceiver 110 illustrated in FIG. 3 is provided as one example configuration of such a transceiver and the transceivers included in the vehicle 102 may include fewer or more components in different configurations or forms than illustrated in FIG. 3 while still providing the functionality described herein as being performed by a transceiver. Also, in some embodiments, different transceivers included in the vehicle 102 may have different configurations or forms while still providing the functionality described herein. In other words, when the vehicle 102 includes multiple transceivers, not all of the transceiver may be identical in some embodiments. As noted above, the transceivers may be used to determine a location of a portable communication device to determine whether the VAS 150 should attempt to pair and bond with the device as described herein.

Figure 4:
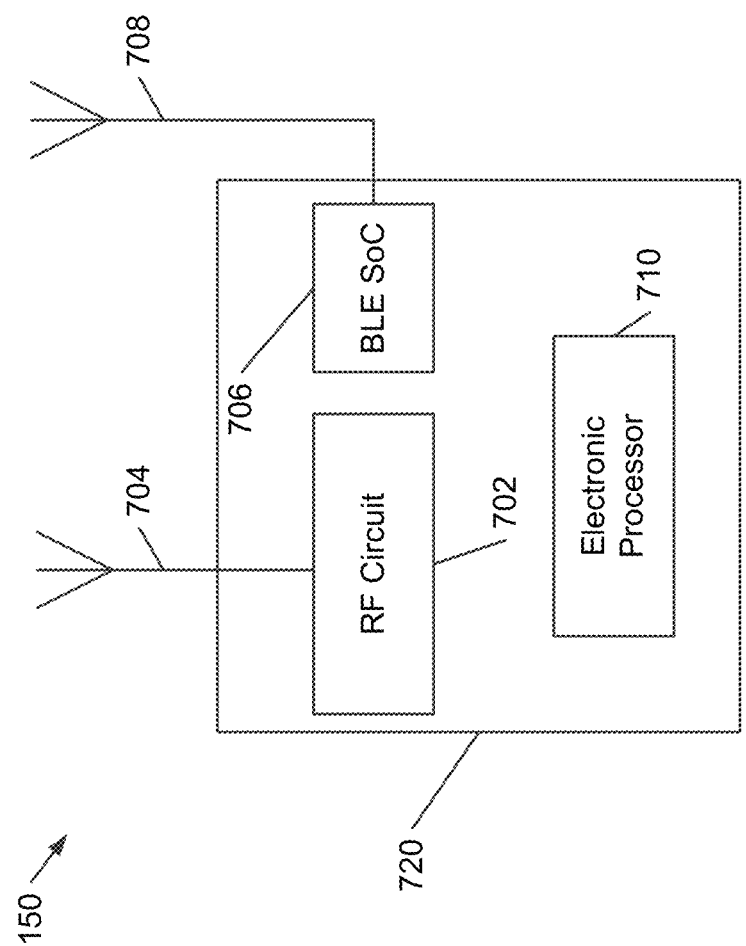
FIG. 4 illustrates a vehicle access system (VAS) included in the PEPS system of FIG. 2 according to some embodiments.

FIG. 4 is a block diagram of the VAS 150 in accordance with some embodiments. As shown in the illustrated embodiment of FIG. 4, the VAS 150 includes an radio frequency (RF) circuit 702 coupled to an antenna 704, an integrated circuit, such as BLE SoC 706, coupled to an antenna 708, and an electronic processor 710 within an enclosure 720. The BLE SoC 706 and antenna 708 form a BLE transceiver or module. In some embodiments, the BLE transceiver (the BLE SoC 706) performs, among other things, the pairing, bonding, and secure data exchange described herein with respect to the VAS 150 relating to PEPS functionality. The BLE SoC 706 may make data received as part of the secure data exchange to the electronic processor 710 for further processing, such as activation of one or more vehicle operations.

The electronic processor 710 is communicatively coupled to the RF circuit 702 and the BLE SoC 706. The electronic processor 710 may include at least one processor or microprocessor that interprets and executes a set of instructions stored in non-transitory memory included in the VAS 150 or separate from the VAS 150 (for example, the memory 208). For example, the electronic processor 710 may be configured to execute one or more software programs to perform a set of functions. The memory storing these one or more software programs may include volatile memory elements (for example, random access memory (RAM)), nonvolatile memory elements (for example, read-only memory (ROM)), and combinations thereof. The memory may have a distributed architecture, where various components are situated remotely from one another, but may be accessed by the electronic processor 710. It should be understood that the VAS 150 illustrated in FIG. 4 is provided as one example configuration of the VAS 150 and, in some embodiments, the VAS 150 may include fewer or more components in different configurations or forms than illustrated in FIG. 4 while still providing the functionality described herein as being performed by the VAS 150.

Figure 5:
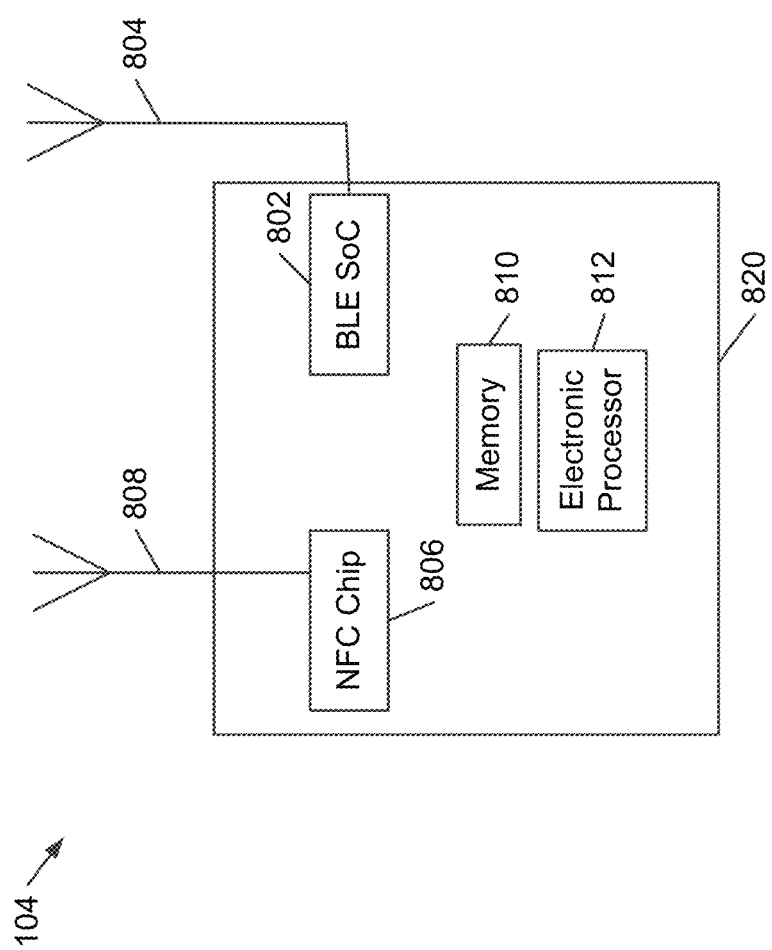
FIG. 5 illustrates a portable communication device configured to communicate with the VAS of FIG. 4 according to some embodiments.

FIG. 5 is a block diagram of the portable communication device 104 according to some embodiments. As illustrated in FIG. 5, in some embodiments, the portable communication device 104 includes a BLE SoC 802 coupled to an antenna 804, a near field communication (NFC) chip 806 coupled to an antenna 808, and a memory 810 controlled by an electronic processor 812 within an enclosure 820. As described above for the BLE SoC 706, the BLE SoC 802 performs, among other things, the pairing, bonding, and secure data exchange described herein with respect to the portable communication device 104 relating to PEPS functionality.

Figure 6:
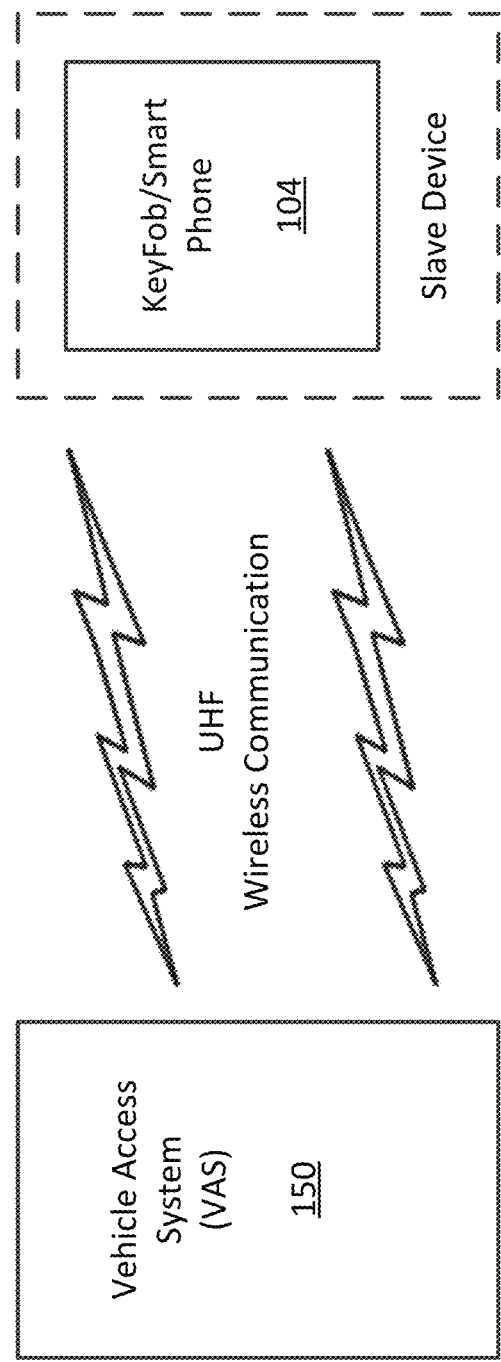
FIG. 6 illustrates communication between the VAS of FIG. 4 and the portable communication device of FIG. 5 according to some embodiments.

The memory 810 stores identification data associated with the portable communication device 104 that is used to wirelessly authenticate the portable communication device 104 with the PEPS functionality associated with the vehicle 102. This identification data is transmitted using at least one of the antenna 804 associated with BLE SoC 802 and the antenna 808 associated with the NFC chip 806. In some embodiments, the memory 810 also stores encryption keys or other mechanisms for encrypting data communicated to the vehicle 102. The memory 810 (or a separate memory included in the portable communication device 104) may also store an operating system, such as iOS provided by Apple Inc. or Android, provided by Google LLC. It should be understood that the portable communication device 104 illustrated in FIG. 5 is provided as one example configuration of such a device and the portable communication device 104 may include fewer or more components in different configurations or forms than illustrated in FIG. 5 while still providing the functionality described herein as being performed by the portable communication device 104. It should be understand that, in some embodiments, the portable communication device 104 and the VAS 150 communicate using ultra high frequency (UHF) communication, as illustrated in FIG. 6.

As noted above, a first part in a BLE protocol is pairing where stake holders (a host device and a member device) in a BLE connection learn about each other. Pairing is typically initiated by the host device (for example, the VAS 150) by sending a pairing request to a member device (for example, the portable communication device 104) with whom the host device is willing to communicate. In response to the member device accepting the pairing request, the member device sends a response back to the host device, indicating that the host device may start the pairing process. After the pairing process is initiated, the host device and the member device learn about each other's characteristics, such as MAC address, BLE version, and so on. Moreover, during the same process, the host device and the member device share encryption key information used to encrypt the communication link between the devices. After the encryption key information is exchanged, the pairing process is terminated, and, depending on preferences of the host device, the member device, or both devices to bond, a bonding request is sent by the host device to the member device. In response to the member device accepting the bonding request, the member device saves the pairing information to respective memory. This allows the member device to bond with the host device upon each re-connection without having to repeat the pairing process.

The BLE core stack offers three methods of pairing, namely, Just Works pairing, MITM pairing, and out-of-band (OOB) pairing. Just Works is a relatively simple form of pairing and typically offers the lowest level of security. MITM pairing generally offers a higher level of security than Just Works pairing by introducing a passkey to authenticate the pairing process. The passkey protects the devices from a hacker or intruder sniffing information exchanged during pairing, which can result in system hacking using the learned information. OOB pairing is generally the most secure way of pairing offered by the core BLE stack. OOB pairing takes place in a different frequency band, and in some embodiments over a different wireless communication protocol than BLE itself, which generally operates in a 2.4-2.4835 GHz ISM frequency band. By exchanging pairing information over another protocol, the OOB pairing method offers improved security from passive eavesdroppers during the pairing process. Embodiments described herein are described and illustrated as using OOB pairing and, in particular, using the OOB pairing method offered by the BLE core stack. It should be understood that the embodiments described herein are not limited to the OOB pairing method and other methods may be used regardless of the examples provided herein.

Figure 7:
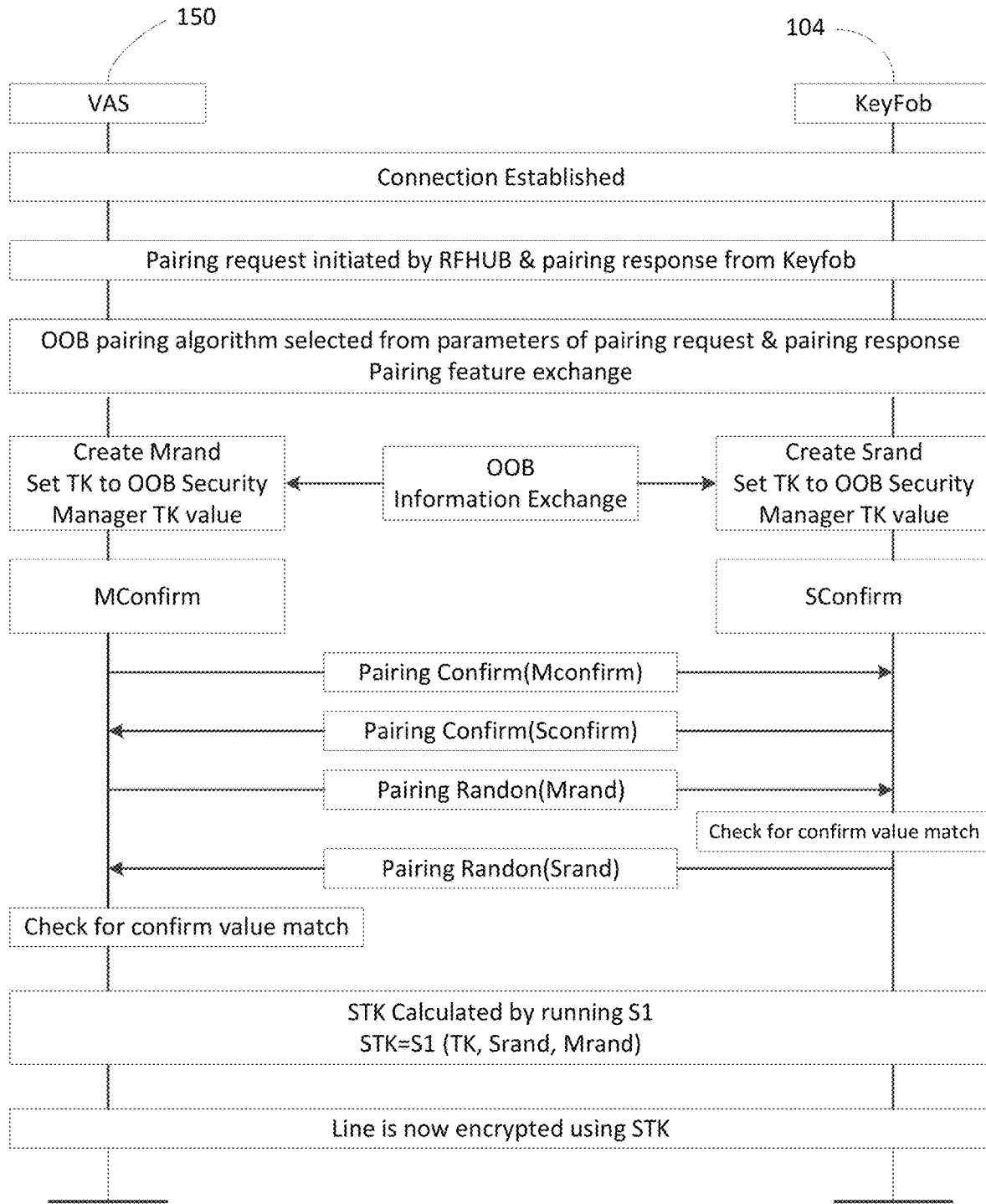
FIG. 7 illustrates a flow of an OOB pairing mechanism offered by a core BLE stack according to some embodiments.

For example, FIG. 7 illustrates an OOB pairing process according to some embodiments. OOB pairing is provided by the BLE stack for pairing, and hence follows a fixed protocol and number of exchanges for any band selected for the operation (other than Bluetooth). In some embodiments, the NFC protocol, which generally operates at 13.56 MHz frequency, is used as the secondary band for the OOB pairing mechanism to share paring information and encryption keys. However, it should be understood that other protocols may be used. In some embodiments, after phase 1—feature exchange, the pairing process goes to phase 2—authentication. During phase 2, key generation and exchange is performed, wherein the keys are used encrypt the connection link to protect against attacks, such as MITM. In some embodiments, Elliptic Curve Diffie-Hellman (ECDH) public key pairing is used as phase 2 authentication between the VAS 150 and portable communication device 104 wherein each device generates its own ECDH public-private key pair. The public-private key pair contains a private key and public key through which the phase 2 pairing is authorized.

Figure 8:
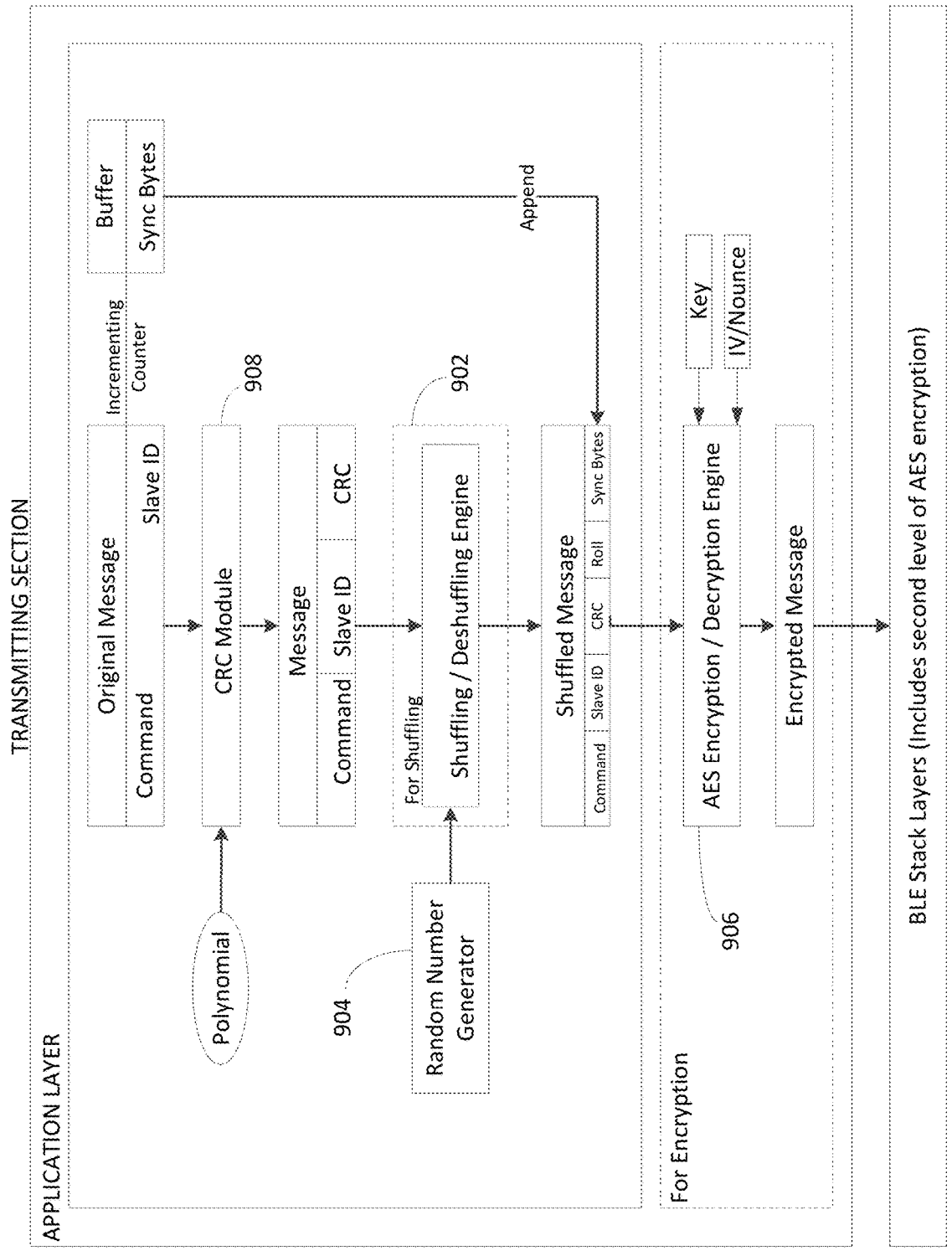
FIG. 8 illustrates a flow of security used for securing application data and commands on a transmitting section of a PEPS system according to some embodiments.

After the pairing and bonding processes is complete as described herein, data communicated between the host device and the member device can be secured. The communicated data can be any kind of data containing information, commands, and the like, from either of the devices (either of the BLE SoCs). FIG. 8 illustrates a flow of security used for securing application data and commands on a transmitting side or section of the PEPS system 200 according to some embodiments. In particular, FIG. 8 illustrates an application layer of the transmitting section for transmitting data from one device (for example, the portable communication device 104 in an example situation) to a paired and bonded device (for example, the VAS 150 in this example situation). As illustrated in FIG. 8, the application layer includes, among other components, a data shuffling/de-shuffling engine 902 and a random number generator 904.

The application layer also includes an encryption/decryption engine 906, such as an Advanced Encryption Standard (AES) Counter with CBC-MAC (CCM) crypto engine, for encryption and decryption. In some embodiments, the application layer also includes a cyclic redundancy code (CRC) module 908 for generating a CRC for each message sent to maintain integrity and authenticity.

Accordingly, to transmit a message from the portable communication device 104 to the paired VAS 150 (including, for example, a command to unlock a door of the vehicle 102, start an engine of the vehicle 102, or the like), the CRC module 908 generates a CRC, which is appended to the message along with a device identifier (to form a data array). The message is then passed to the data shuffling/de-shuffling engine 902 where bits or bytes within the message are randomly shuffled. To shuffle the message randomly, an input can be fed from the random number generator 904.

Figure 9:
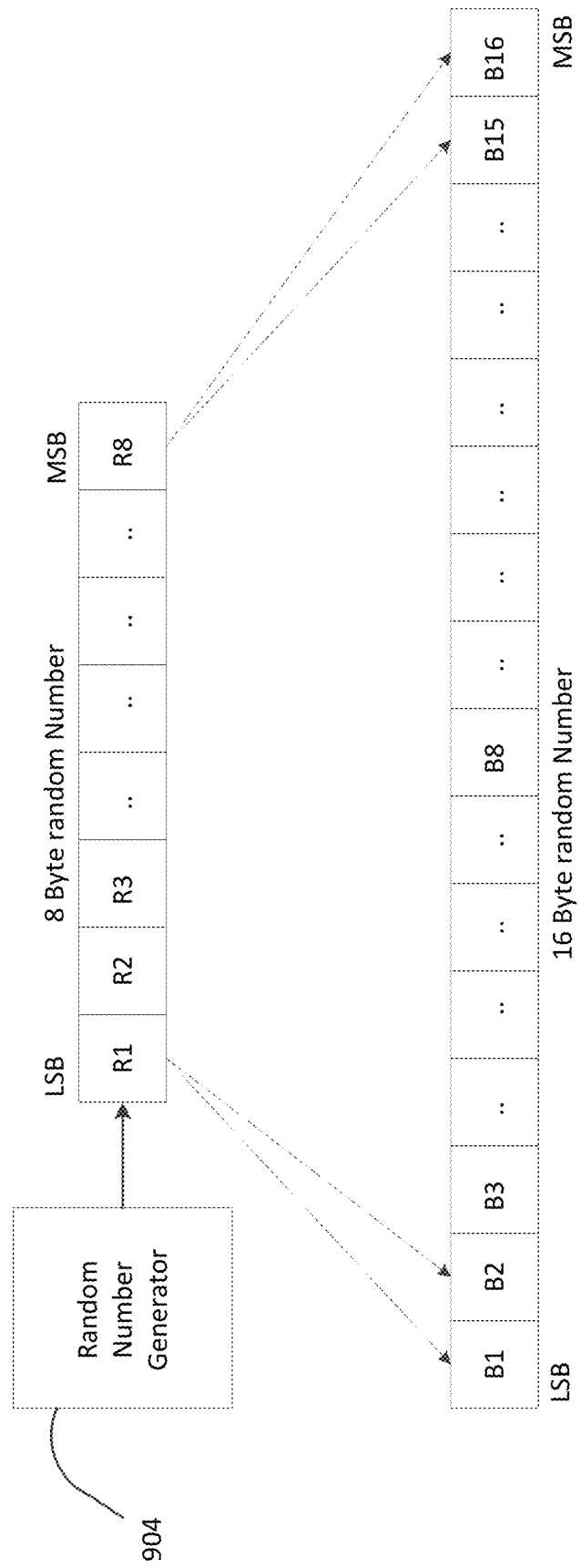
FIG. 9 illustrates a method of generating an 8-byte random number and splitting the random number into a 16-byte random number according to some embodiments.
Figure 10:
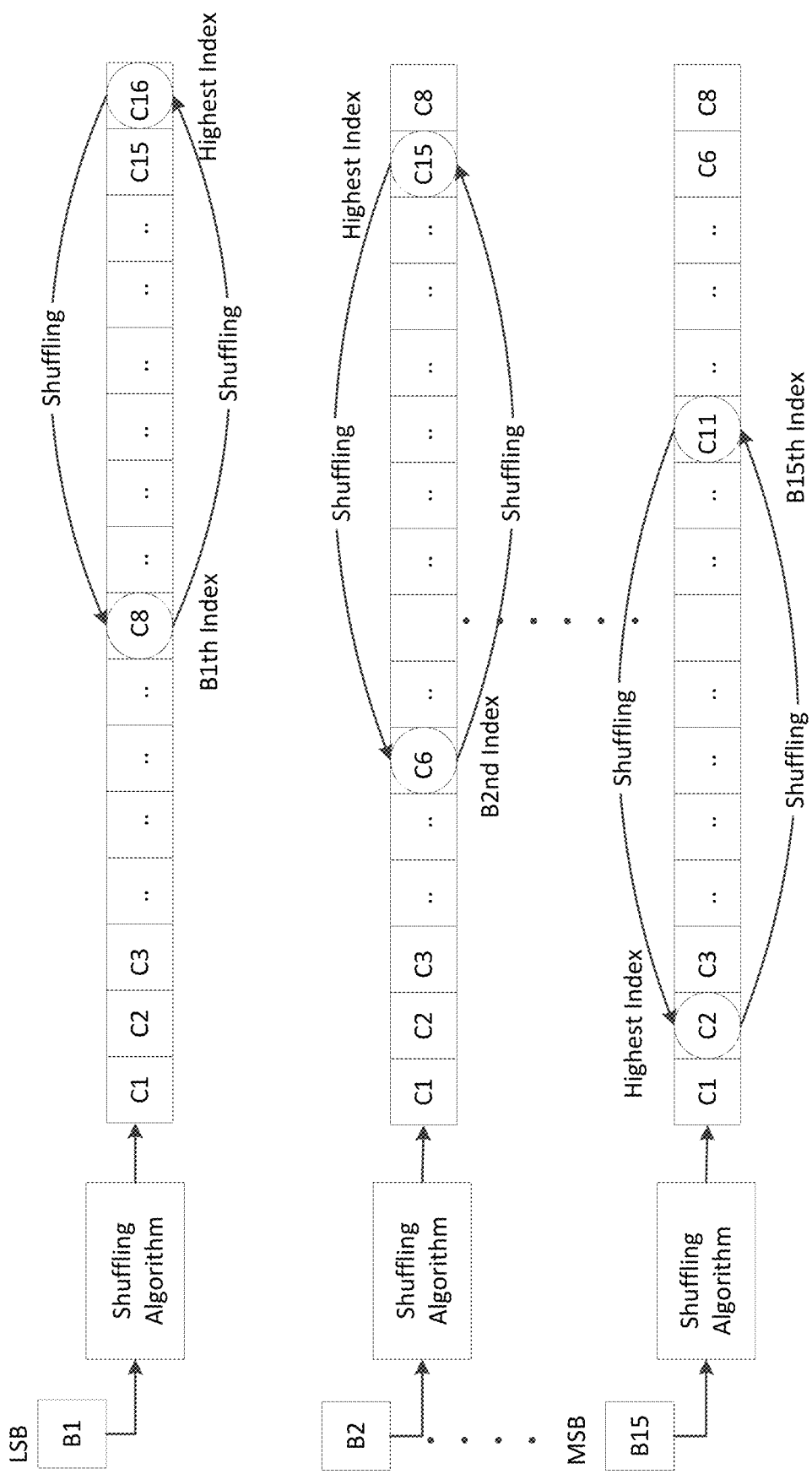
FIGS. 10 and 11 illustrate a method of shuffling message bytes with a 16-byte random number according to some embodiments.
Figure 11:
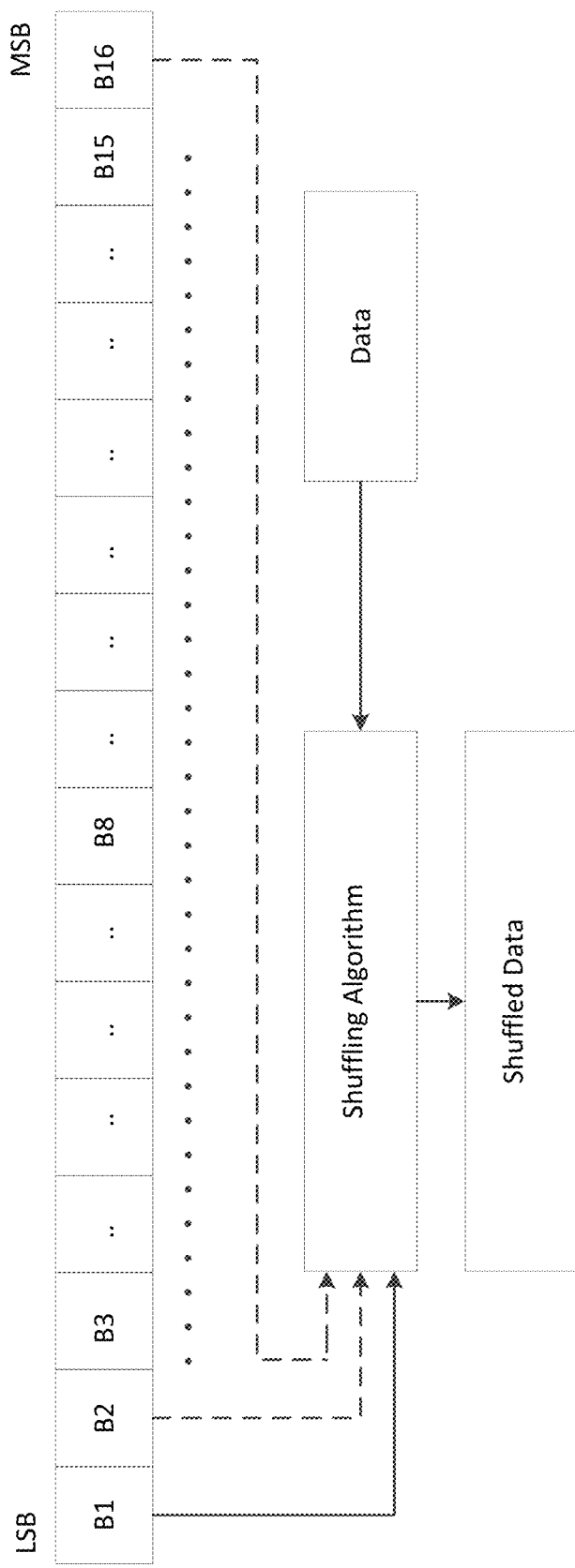

For example, in some embodiments, the data shuffling/de-shuffling engine 902 takes an 8-byte input from the random number generator 904. A sample 8-byte random number is illustrated in FIG. 9 by way of example. This random number is converted into a 16-byte input by splitting each byte of the 8-byte random number into two nibbles (for example, a lower nibble and a higher nibble), and then promoting them to a byte. Accordingly, a 16-byte random number is derived from the 8-byte random number as illustrated in FIG. 9. With continued reference to FIG. 9, B1 is the least significant byte (LSB) and B16 is the most significant byte (MSB). The 16-byte random number is fed byte-by-byte (for example, from LSB to MSB) to the data shuffling/de-shuffling engine 902 to shuffle two bits or two bytes of data (included in the data array formed by the message with appendages) at a time as illustrated in FIGS. 10 and 11. It should be understood that the different length random numbers may be used to provide different amounts of shuffling or to account for messages of various lengths. Furthermore, in some embodiments, a random number may be generated of an appropriate length without needing splitting and promoting as described herein.

For example, to perform the shuffling, in some embodiments, the individual bit at the index defined by the fed byte from the 16-byte random number is exchanged with the individual bit at the then-current highest index of the data array, including the message, device identifier, and CRC in some embodiments. For example, as shown in FIG. 10, when the LSB of the random number (B1) is fed to the shuffling/de-shuffling engine, the bit at the B1 index is shuffled with (exchanged with) the number at the current highest index of the data array (B16). This process continues by decrementing the current highest index of the data array for each iteration of shuffling (each byte of the 16-byte random number) until all the elements (bits) of the data array are shuffled. After the shuffling is complete, the initially-generated 8-byte random number (herein also referred to as the "roll") is appended to the shuffled data array for de-shuffling the same on the receiving side of the system. It should be understood using bytes of the random number is provided as one example for shuffling bits. In other embodiments, different portions or subsets of the random number used to perform the bit shuffling, including using more than one byte. Furthermore, in some embodiments, a portion or subset of the random number may further processed (for example, multiplied, added or subtracted from a value, or the like) to generate an index within the data array for performing the shuffling as described herein.

The outcome of the data shuffling/de-shuffling engine 902 will vary each time even when the same message is fed at different instances. Hence, the data shuffling/de-shuffling engine 902 improves security of transmitted data against passive eavesdropping attacks that attempt to learn and decode the data (to understand the mechanism of the pre-scribed PEPS system). Furthermore, shuffling at the individual bit level (as compared to at a byte level) may provide further security as more exchanges are performed in this embodiment.

After the message appended with the device identifier and the corresponding CRC is shuffled, the shuffled information is passed to the encryption/decryption engine 906. The encryption/decryption engine 906 may use dedicated cryptography hardware and dynamic memory to encrypt the inputted information. By using the dedicated encryption/decryption engine 906 in the PEPS system 200, the speed of encryption and decryption is increased, the processing load on the hardware performing the encryption and decryption is decreased, or a combination thereof. In some embodiments, the encryption/decryption engine 906 also receives as input an encryption key and an initialization vector (IV), which is used to encrypt inputted plaintext information. For example, a 13-byte IV includes a 4-byte randomly-generated sync byte and a 9-byte counter that is incremented whenever a message is sent or received by a module to maintain synchronicity. These randomly-generated 4-byte numbers or "sync bytes" can be shared as part of the message for decryption on the receiving side of the system. The counter value can also be shared periodically to check for counter synchronicity.

As illustrated in FIG. 8, after the encryption/decryption engine 906 encrypts the shuffled message (including shuffled plaintext information), the encrypted message can be passed to the BLE stack layer. The BLE stack layer can encrypt the data again with a key shared during the pairing process (and which is available to the devices sharing the link) and can transmit the result. This dual encryption (one in the application layer and one in the BLE stack layer) provides for greater security, and makes it less probable for a hacker to breach encryption by brute force.

Figure 12:
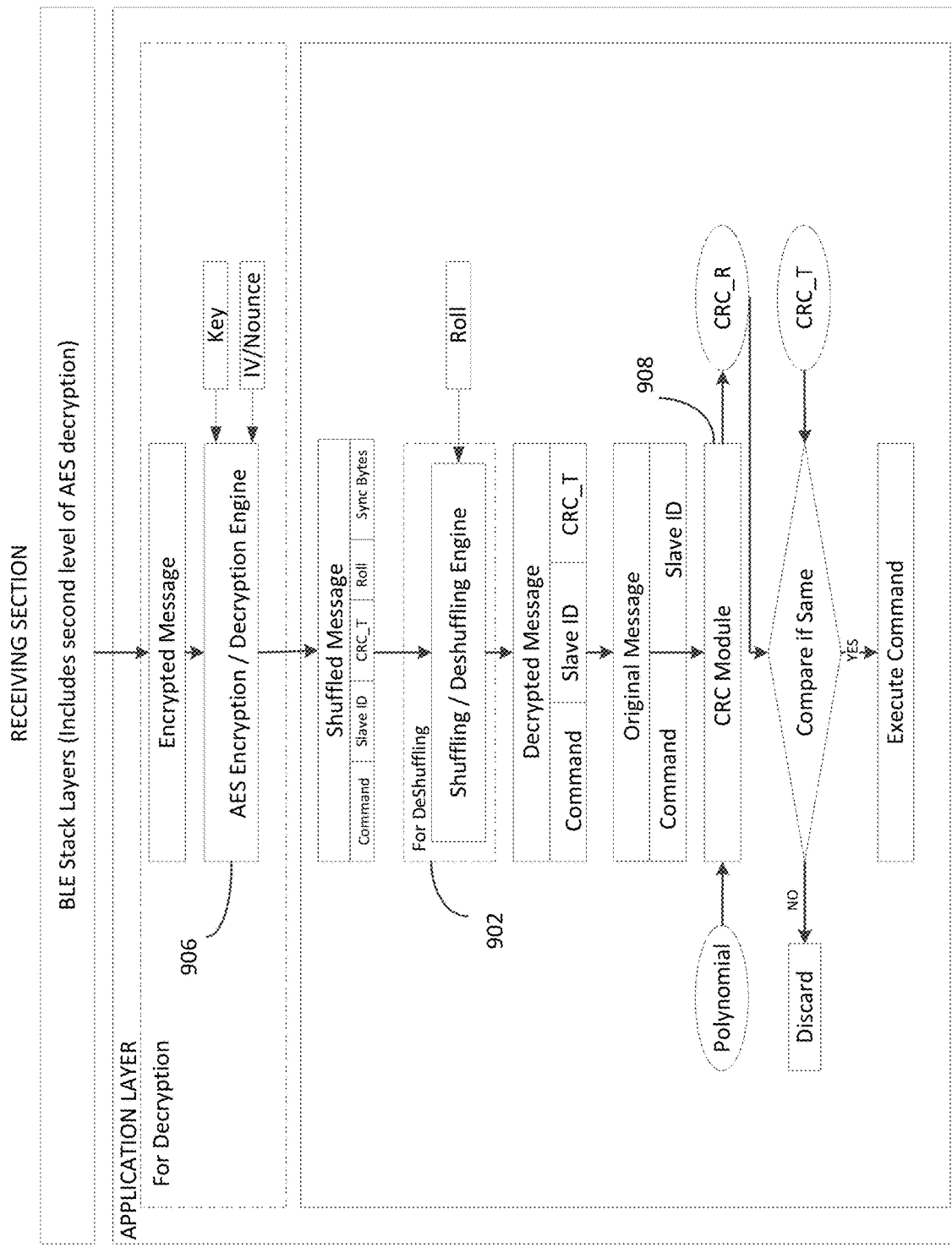
FIG. 12 illustrates a flow of security used for securing application data and commands on a receiving section of a PEPS system according to some embodiments.

FIG. 12 illustrates the same or similar modules in the application layer of the receiving side or section of the PEPS system 200 (for example, the VAS 150 in one example) as described above with regard to the transmitting section, including the data shuffling/de-shuffling engine 902 and the encryption/decryption engine 906. In the illustrated transmitting section, the above-described modules perform a function of shuffling and encrypting the message, respectively. In receiving section, the same or similar modules perform a function of de-shuffling and decrypting the transmitted data packet, respectively.

In particular, in response to receiving a transmitted data packet by the receiving section, the data packet is passed to the BLE stack layers. The BLE stack layers decrypt the message using encryption information shared during the pairing process. The decrypted message is then passed to the application layer. In the application layer, the packet is first passed to the encryption/decryption engine 906 for further decryption of the encrypted packet with the IV and the encryption keys as inputs. The further decrypted message can then be passed to the data shuffling/de-shuffling engine 902 for de-shuffling. The data shuffling/de-shuffling engine 902 takes the 8-byte roll (appended to the message during the shuffling process in the encryption section as described above) as a parameter and generates a 16-byte random number as described above. The generated 16-byte random number is fed in a reverse order (for example, from MSB to LSB) to de-shuffle the message using the shuffling algorithm described above. After the data is de-shuffled, the message packet is broken to extract the original message and the generated CRC for the same, both of which can then be stored in a buffer. The original message can also be passed to the CRC module 908 included in the application layer of the transmitting section, wherein the CRC module 908 compares a generated CRC (based on the extracted message) can be compared with the CRC stored in the buffer to check the authenticity of the message. In response to determining that the message is authentic (based on the CRCs), the message packet is authorized to be valid data and the command can be executed. For example, the command can be an unlock or lock command for one or more doors of the vehicle 102.

All of the above-mentioned modules may be implemented on both sides of a BLE PEPS system 200 to address software attacks on wireless communication protocols and to improve data security against the same.

The ability to overcome relay attacks is an important goal for many wireless communication systems. Relay attacks have become common in the automotive industry since the introduction of RKE systems in automobiles. To address relay attacks in systems and methods disclosed herein, an accelerometer in the portable communication device 104 can be used along with an implementation of Time of Flight (ToF) to calculate the approximate distance of the portable communication device 104 from the VAS 150.

In some embodiments, the accelerometer is (constantly) active to track movement of the portable communication device 104. When the portable communication device 104 is stationary and is out of BLE range of the VAS 150, the portable communication device 104 can enter a low power mode and can stop advertising. In response to motion being detected again by the accelerometer present in the portable communication device 104, the portable communication device can look for accelerometer data corresponding to motion for a fixed interval of time before the portable communication device 104 wakes up from its low power mode and starts advertising. This sleep and wake-up of the portable communication device 104 can improve the device's battery life. Furthermore, the accelerometer data can be used as an input to grant vehicle access to the user. For example, as the user approaches the vehicle, the accelerometer data translates the motion of the user along with the portable communication device 104. When the user is near the vehicle 102 (for example, near a door) and halts or slows, the variation in accelerometer data is monitored and assessed. This change of accelerometer data (for example, from motion to a stationary condition, or from one type of motion to another type of motion) is taken as an input to invoke the ToF to calculate the approximate distance of the portable communication device from the VAS 150, and to confirm its proximity to the vehicle to avoid relay attack. This process reduces the possibility of a relay attack on the PEPS system 200 at any given point of time, and hence strengthens the security of the PEPS system 200.

Accordingly, the systems and methods disclosed herein allow for securing command/message frames by shuffling and de-shuffling field elements of the frames. In some embodiments, shuffling is done with a randomly-generated number input from a random number generator. In some embodiments, the random number used to shuffle the command/message (which can be shuffled at a bit level or a byte level) is appended to the message for de-shuffling on the receiving side. The shuffling and de-shuffling can be implemented in the BLE application layer. However, in some embodiments, the VAS 150 and the portable communication devices 104 are configured to shuffling and de-shuffling the message frame as described herein.

Embodiments described herein also provide for securing shuffled command/message frames by encrypting and decrypting in the application layer. In some embodiments, an encryption/decryption engine is implemented in the application layer for data encryption and decryption. Also, in some embodiments a counter value is shared periodically between both ends to check the synchronicity of the encryption/decryption engine. Some embodiments may also use an IV, which can include two parts: a randomly-generated number and a rolling counter. In some embodiments, the randomly-generated part of the IV (sync bytes) is appended to the message frame for decryption on the receiving side. Also, in some embodiments both the VAS 150 and the portable communication devices 104 in the communication are configured to encrypt and decrypt the data in the application layer Some embodiments described herein also use accelerometer data along with a BLE connection status to place a portable communication device in low-power operating mode. Also, in some embodiments, embodiments use accelerometer data to invoke a ToF computation for proximity measurement. For example, in some embodiments, accelerometer data is used along with ToF measurements to grant vehicle access to help avoid relay attacks on the system In the foregoing specification, specific embodiments have been described. However, one of ordinary skill in the art would appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as critical, required, or essential features or elements of any or all the claims. The invention is defined solely by the appended claims, including any amendments made during the pendency of this application, and all equivalents of those claims as issued.

The Abstract of the Disclosure is provided to allow the reader to quickly ascertain the nature of the technical disclosure, and is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Thus, the following claims are hereby incorporated into the Detailed Description, with each claim standing on its own as a separately claimed subject matter Various features and advantages of some embodiments are set forth in the following claims.

What is claimed is:

1. A system for secure communication between a vehicle and a portable communication device, the system comprising:
a vehicle access system included in the vehicle, wherein the vehicle access system is configured to
wirelessly receive a shuffled message and a random number from the portable communication device, the shuffled message including a plurality of bits at bit positions 0 through n and the random number having a value specifying one of the bit positions 0 through n of the shuffled message,
de-shuffle the shuffled message at a bit level to obtain a message, wherein de-shuffling the shuffled message at the bit level includes exchanging one bit within the shuffled message positioned at the bit position specified by the value of the random number with another bit within the shuffled message, and
initiate a vehicle operation based on the message.

2. The system of claim 1, further comprising:
the portable communication device, wherein the portable communication device is configured to
generate the random number,
shuffle the message at a bit level based on the random number to generate the shuffled message, and
wirelessly transmit the shuffled message and the random number to the vehicle access system.

3. The system of claim 2, wherein the portable communication device is further configured append an identifier of the portable communication device and a cyclic redundancy check code to the message before shuffling the message.

4. The system of claim 2, wherein the portable communication device is further configured to encrypt the shuffled message and the random number before transmitting the shuffled message and the random number to the vehicle access system.

5. The system of claim 4, wherein the portable communication device is configured to encrypt the shuffled message and the random number by
performing a first encryption of the shuffled message and the random number in a Bluetooth application layer using encryption information exchanged during a pairing process performed between the vehicle and the portable communication device, and
performing a second encryption of the shuffled message and the random number in a Bluetooth stack layer using an encryption key and an initialization vector.

6. The system of claim 1, wherein the vehicle access system is configured to de-shuffle the shuffled message in a Bluetooth application layer.

7. The system of claim 1, wherein the vehicle access system is configured to wirelessly receive the random number by
receiving an initial random number,
splitting each byte of the initial random number into two portions, and
promoting each of the two portions to a byte to generate an extended random number, wherein the random number is one byte of the extended random number, and
wherein the vehicle access system is configured to exchange the one bit within the shuffled message positioned at the bit position specified by the value of the random number with another bit within the shuffled message by
(a) exchanging the one bit within the shuffled message positioned at the bit position specified by the value of the random number with a bit within the shuffled message positioned at a current highest bit position and
(b) decrementing the current highest bit position.

8. The system of claim 7, wherein the vehicle access system is further configured to repeat (a) and (b) for each other byte of the extended random number in a predetermined order, wherein the predetermined order is opposite an order used by the portable communication device to generate the shuffled message.

9. The system of claim 1, wherein the vehicle access system is further configured to decrypt the shuffled message before de-shuffling the shuffled message.

10. The system of claim 9, wherein the vehicle access system is configured to decrypt the shuffled message by
performing a first decryption of the shuffled message in a Bluetooth stack layer using an encryption key and an initialization vector, and
performing a second decryption of the shuffled message in a Bluetooth application layer using encryption information exchanged during a pairing process performed between the vehicle and the portable communication device.

11. A method for secure communication between a vehicle and a portable communication device, the method comprising:
wirelessly receiving, with a vehicle access system included in the vehicle, a shuffled message from the portable communication device and a random number, the shuffled message including a plurality of bits at bit positions 0 through n and the random number having a value specifying one of the bit positions 0 through n of the shuffled message;
de-shuffling, with the vehicle access system, the shuffled message at a bit level to obtain a message, wherein de-shuffling the shuffled message at the bit level includes exchanging one bit within the shuffled message positioned at the bit position specified by the value of the random number with another bit within the shuffled message; and
initiating, with the vehicle access system, a vehicle operation based on the message.

12. The method of claim 11, wherein de-shuffling the shuffled message includes de-shuffling the shuffled message in a Bluetooth application layer.

13. The method of claim 11, wherein wirelessly receiving the random number includes
receiving an initial random number,
splitting each byte of the initial random number into two portions, and
promoting each of the two portions to a byte to generate an extended random number, wherein the random number is one byte of the extended random number, and
wherein exchanging the one bit within the shuffled message positioned at the bit position specified by the value of the random number with another bit within the shuffled message includes
(a) exchanging the one bit within the shuffled message positioned at the bit position specified by the value of the random number with a bit within the shuffled message positioned at a current highest bit position and
(b) decrementing the current highest bit position.

14. The method of claim 13, further comprising repeating (a) and (b) for each other byte of the extended random number in a predetermined order, wherein the predetermined order is opposite an order used by the portable communication device to generate the shuffled message.

15. The method of claim 11, further comprising decrypting the shuffled message before de-shuffling the shuffled message.

16. The method of claim 15, wherein decrypting the shuffled message includes
performing a first decryption of the shuffled message in a Bluetooth stack layer using an encryption key and an initialization vector, and
performing a second decryption of the shuffled message in a Bluetooth application layer using encryption information exchanged during a pairing process performed between the vehicle and the portable communication device.

17. A vehicle access system installed in a vehicle, the vehicle access system comprising:
a wireless communication transceiver; and
an electronic processor,
the wireless communication transceiver configured to
wirelessly receive a shuffled message and a random number from a portable communication device, the shuffled message including a plurality of bits at bit positions 0 through n and the random number having a value specifying one of the bit positions 0 through n of the shuffled message;
de-shuffle the shuffled message at a bit level to obtain a message, wherein de-shuffling the shuffled message at a bit level includes exchanging one bit within the shuffled message positioned at the bit position specified by the value of the random number with another bit within the shuffled message, and
provide the message to the electronic processor,
the electronic processor configured to initiate a vehicle operation based on the message.

18. The vehicle access system of claim 17, wherein the vehicle operation includes at least on selected from a group consisting of an unlock operation and a lock operation of a door of the vehicle.

19. The vehicle access system of claim 17, wherein the wireless communication transceiver is configured to wirelessly receive the random number by
wirelessly receiving an extended random number, wherein the random number is one byte of the extended random number, and
wherein the wireless communication transceiver is configured to exchange the one bit within the shuffled message positioned at the bit position specified by the value of the random number with another bit within the shuffled message by
(a) exchanging the one bit within the shuffled message positioned at the bit position specified by the value of the random number with a bit within the shuffled message positioned at a current highest bit position and
(b) decrementing the current highest bit position, and
wherein the wireless communication transceiver is further configured to repeat (a) and (b) for each other byte of the extended random number in a predetermined order, wherein the predetermined order is opposite an order used by the portable communication device to generate the shuffled message.

20. The vehicle access system of claim 17, wherein the wireless communication transceiver is further configured to decrypt the shuffled message before de-shuffling the shuffled message, wherein the wireless communication transceiver is configured to decrypt the shuffled message by
performing a first decryption of the shuffled message in a Bluetooth stack layer using an encryption key and an initialization vector, and
performing a second decryption of the shuffled message in a Bluetooth application layer using encryption information exchanged during a pairing process performed between the vehicle and the portable communication device.

* * * * *